Jan. 20, 1959  A. H. HAROLDSON ET AL  2,870,295
REFUSIBLE FUSEHOLDER
Filed April 24, 1957
FIG.1.
FIG.2.
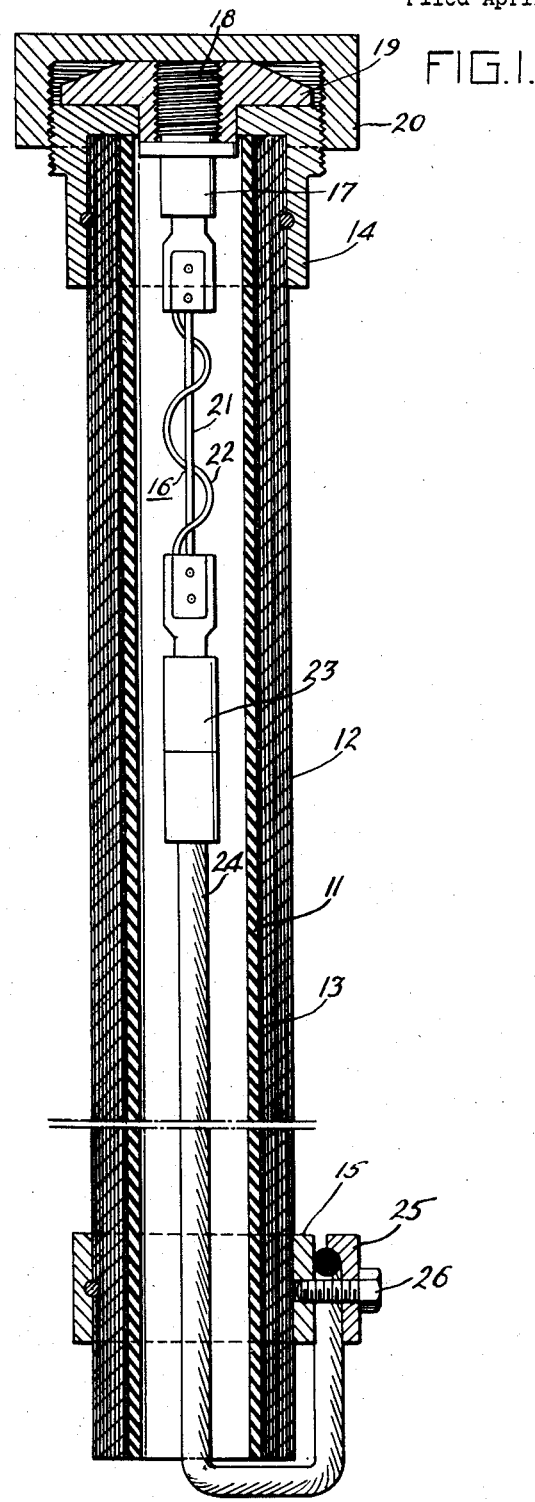
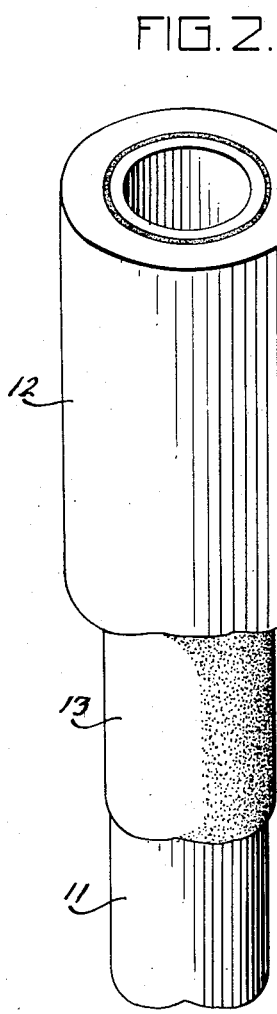
INVENTORS:
ARTHUR H. HAROLDSON
HUBERT L. COX
BY Howson & Howson
ATTYS.

United States Patent Office 2,870,295
Patented Jan. 20, 1959

2,870,295

REFUSIBLE FUSEHOLDER

Arthur H. Haroldson and Hubert L. Cox, Newark, Del., assignors to Continental-Diamond Fibre Corporation, Newark, Del., a corporation of Delaware Application April 24, 1957, Serial No. 654,897

9 Claims. (Cl. 200—131)

This invention relates generally to insulating tubes for surrounding and confining electric arcs and extinguishing the same, and more particularly to an improved refusible fuse-holder or fuse tube and a method for manufacturing the same.

In a circuit or current interrupting device, for example one having a fusible link, a structure is generally provided for confining the electric arc that is drawn when the device operates to interrupt the current. As is well known, that portion of the arc-confining structure, which is to be adjacent to the arc, is usually formed of a material, such as vulcanized fiber, which is adapted to evolve electric arc extinguishing gases when subjected to an electric arc. These arc extinguishing gases so generated are under a very high pressure; thus, the arc-confining structure is subjected to tremendous stresses. In addition, it is common place to locate circuit interrupting devices, such as fuses, out of doors where they may be subjected to severe conditions of weather. Although vulcanized fiber is tough and strong and is an excellent material from which to provide electrical arc extinguishing gas-generating means, this material does not have the requisite bursting strength to withstand the high explosive forces resulting from a high intensity arc. Also, vulcanized fiber absorbs water, and thus does not have desirable weather resisting properties. Accordingly, it has been the practice to surround such a material with another material which is relatively strong and capable of resisting the tremendous stresses due to high pressure gases generated within the circuit interrupting apparatus, which material, preferably, has good weather resisting properties.

It has been suggested to provide such a structure for confining the electric arc resulting from the operation of a current interrupting device comprising a tubular liner of vulcanized fiber, surrounded by an outer tubular member or sleeve for imparting high bursting strength and weather resistant properties to such structure consisting of a woven glass fabric impregnated with a resin and wound about the inner liner. In the manufacture of such an arc-confining structure, after the resin-impregnated glass fabric is wound about the liner, the resulting tube is compacted in a die under pressure and cured by application of heat to obtain a bond between the inner and outer tubes. Providing the surface of the liner with knurls to enchance the bond between the liner and sleeve has been suggested, since resins, such as melamine and phenolic resins, which provide suitable strength and weather resistant properties, do not form a satisfacory bond with the inner vulcanized fiber tube. However, according to the results of certain tests, knurling of the vulcanized fiber inner tube has been found to reduce, rather than increase, bond strength. In addition, during molding in a die under heat and pressure, seam marks result due to cutting off of the edges of the tubing by the die, and the fiber tube "flows" to some degree resulting in a non-uniform structure. The seam marks and non-uniform structure substantially reduce the overall mechanical properties of the arc-confining tube structure.

It is the principal object of this invention to provide an inexpensive arc-confining structure of greatly improved bursting strength and excellent weather resisting properties.

Another object of this invention is the provision of a fuse tube capable of withstanding the tremendous stresses caused by high pressure electric arc extinguishing gases generated within the fuse tube upon rupture of the fuse link.

A further object of this invention is the provision of novel means for bonding an inner tubular liner of a material adapted to evolve electric arc extinguishing gases to an outer sleeve of resin-impregnated inorganic fibers to provide a refusible fuseholder or fuse tube of substantially increased strength and excellent weather resistant properties.

Still another object of this invention is the provision of a current interrupting device embodying a novel fuse tube of greatly improved bursting strength and excellent weather resisting properties.

These and other objects of this invention will become clearly apparent from a consideration of this specification, drawing and claims.

The novel fuse tube or fuseholder of this invention comprises an inner tubular liner of vulcanized fiber, a sleeve for said liner comprising inorganic fibers impregnated and bonded together with an epoxy resin, and an adhesive material disposed between said liner and sleeve, by which said liner is bonded to said sleeve, comprising a phenol aldehyde resin which upon heating is capable of being converted into the infusible, insoluble state, and a vinyl polymer selected from the group consisting of a polyvinyl acetal, a partially hydrolyzed polyvinyl acetate, and copolymers of polyvinyl alcohol and polyvinyl acetate. Preferably, an adhesive material comprising from about 20 percent to about 35 percent, by weight, of a phenol formaldehyde resin and from about 80 percent to about 65 percent of polyvinyl butyral resin is disposed between the tubular liner and sleeve comprising glass cloth convolutely wrapped about said liner, the convolutions of the cloth being impregnated and bonded together with an epoxy resin.

According to another embodiment of this invention, there is provided an electric circuit interrupting device comprising in combination, a refusible fuseholder and means therein adapted to fuse and form an arc on the occurrence of an overload in an electric circuit, said fuseholder comprising an inner tubular liner of vulcanized fiber, a sleeve for said liner comprising inorganic fibers impregnated and bonded together with an epoxy resin, and an adhesive material disposed between said liner and sleeve by which said liner is bonded to said sleeve comprising a phenol aldehyde resin which upon heating is capable of being converted into the infusible, insoluble state and a vinyl polymer selected from the group consisting of polyvinyl acetal, a partially hydrolyzed polyvinyl acetate, and copolymers of polyvinyl alcohol and polyvinyl acetate.

The invention is disclosed in the embodiment thereof shown in the accompanying drawing, and it comprises the features of construction, combination of elements, arrangement of parts and methods of manufacture which will be exemplified hereinafter, and the scope of the application of which will be indicated in the appended claims.

For a more complete understanding of the nature and scope of this invention, reference may be had to the following detailed description taken in connection with the accompanying drawing in which Fig. 1 is a perspective view of the preferred fuse tube or refusible fuseholder of this invention, and Fig. 2 is an elevational view, in section, of a current interrupting device comprising the refusible fuseholder of this invention in combination with means adapted to fuse and form an arc on the occurrence of an overload in an electric circuit.

Referring now to the drawing, and more particularly to Fig. 2, shown therein is a refusible fuseholder or fuse tube comprising an inner liner or tubular member 11, adapted to evolve electric arc extinguishing gases when subjected to an electric arc. Tubular liner 11 may be constructed of vulcanized fiber, as is well known in the art, and is primarily an electric arc extinguishing gas generating means. Tubular line 11, however, is not strong enough of itself to withstand the high explosive forces resulting from a high intensity arc.

Liner 11 is surrounded by an outer tubular member or sleeve 12, which imparts extremely high bursting strength and excellent weather resisting properties to the fuseholder. Sleeve 12 comprises a glass cloth wound convolutely about tubular liner 11, and the convolutions of cloth are impregnated and bonded together by means of an epoxy resin. The fibers of the glass cloth are preferably arranged primarily circumferentially and longitudinally of liner 11.

Disposed between tubular liner 11 and sleeve 12 is an adhesive material 13, more fully described hereinafter, by means of which liner 11 and sleeve 12 are bonded firmly together. By use of adhesive material 13, it was found that a bond of tremendous strength between the sleeve and liner is obtained to produce a refusible fuseholder of substantially increased bursting strength and improved weather resisting properties. The remarkable physical properties of the fuse tube of this invention will become clearly apparent from a consideration of test data appearing hereinafter.

A preferred method by which the fuse tube or refusible fuseholder illustrated in Fig. 2 may be prepared is by wrapping a web of paper, preferably rag paper (almost 100% alpha cellulose) which has been treated with zinc chloride about a mandrel to form an inner tubular liner 11 of the desired thickness. Instead of using zinc chloride as the vulcanizing agent for the fiber of the tubular liner, any of the other well known agents, as for example acids such as sulfuric acid, may be used to provide the vulcanized fiber. The zinc chloride is removed from the tubular liner by leaching, and the purified tube is dried and subjected to a rolling operation which reduces the outside diameter of the tube. The outer circumferential surface of the roller tube may then be subjected to a grinding operation, as in a centerless grinder employing a relatively fine grinding wheel, to provide the tube with more exact and uniform dimensions. Preferably, the tube is provided as nearly as possible with the desired dimensions and uniformity by the rolling operation, so that in providing the finished fiber tube in a suitable condition for assembly with the sleeve, a minimum of grinding or other machining operations will be required. The reason for this is that in manufacture of the fiber tubing, the zinc chloride or other chemical treating agent remains in contact with the surface plies of the tube for a shorter period of time than for the inner plies, since during the "puring" operation by which the zinc chloride is removed, the zinc chloride on the surface plies is removed first and the shorter reaction time of the zinc chloride on the outer plies produces a more fibrous, somewhat "papery," less dense fiber surface. This "papery" surface has a greater affinity for the adhesive since it permits penetration of the adhesive into the fiber surface. This is particularly advantageous since the adhesive is somewhat hydrophilic and has a high affinity for the low density fibers. During the rolling operation, the "papery" nature of the fiber tube is not destroyed to any substantial degree. Thus, removal of the "papery" surface, as for example by grinding, sanding or otherwise preferably should be done to a minimum extent in providing the necessary dimensional tolerance. The tube may also be polished, if desired, in a suitable buffing operation. Although fiber tubes which have undergone a knurling operation may be employed in the fuse tube of this invention, the use of a tube having a knurled surface is less desirable since the knurling operation has been found to destroy, to some extent, the "papery" nature of the tube surface. A preferred tube comprises one in which the fiber density of the outer circumferential surface is not substantially greater than the fiber density of the outer surface of a rolled tube.

The exterior surface of tubular liner 11 is then coated with an adhesive material, more fully described hereinafter, and a glass cloth impregnated with an epoxy resin is wound tightly about the liner to the desired thickness. Thereafter the tube so formed is heated, as for example in a suitable oven, to cure the resin and adhesive material to firmly bond the sleeve to the fiber liner. In employing a preferred adhesive material of this invention, i. e. an adhesive comprising a thermosetting phenol formaldehyde resin and a vinyl butyral resin, the resin and adhesive of the composite structure may be cured by heating the structure at a temperature of about 250° F. for a period of about one hour, followed by heating the structure at a temperature of about 275° F. and then about 290° F. for similar time periods. By making the fuse tube of this invention according to the described preferred manner, the tube is free of undesirable seam marks which are present in a tube molded under heat and pressure and which reduce the bursting strength. In addition, the bursting strength of a molded tube is lowered because of distortion of the fiber during the pressing operation. Advantageously, no fiber distortion takes place in making a fuse tube according to this invention.

The fuseholder illustrated in the drawing has a sleeve 12 comprising glass fabric impregnated with epoxy resin. However, other inorganic fibers, as for example asbestos fibers, may be employed in place of glass fibers. These inorganic fibers may be randomly disposed in the form of a web, or they may be oriented for example, by being woven into a cloth. Preferably, glass fibers are employed, which fibers are woven into a cloth wound about liner 11 in such a manner that the fibers thereof are disposed primarily circumferentially and longitudinally of the axis of liner 11.

Epoxy resins which may be employed to impregnate the inorganic fibers of sleeve 12 for the purpose of binding the superimposed layers of fiber together to form a physically strong and weather proof outer sleeve, are well known and may be prepared by condensing a polyhydric phenol with a polyepoxide or a polyfunctional halohydrin. These epoxy resins may be represented by the general formula:

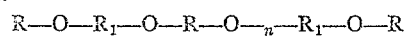

$$R-O-R_1-O-R-O-_n-R_1-O-R$$

wherein R represents a polyepoxide residue, $R_1$ represents a polyhydric phenol residue, and $n$ is 0 to 20.

The polyhydric phenols which may be employed in the formation of these epoxy resins are mononuclear and polynuclear. Suitable mononuclear polyhydric phenols include resorcinol, hydroquinone and catechol, and suitable polynuclear polyhydric phenols include p,p'-dihydroxyphenone and polyhydric anthracenes. The preferred polyhydric phenol is bis-phenol A.

The polyepoxides which may be employed in the formation of suitable epoxy resins contain two or more epoxide groups. The simplest polyepoxides contain at least 4 carbon atoms, e. g., 1,2-epoxy-3,4-epoxy butane. Polyepoxides which may be employed can be derived from a polyhydric alcohol such as mannitol, sorbitol, erythritol, etc. Polyepoxides can also be provided by employing a polyfunctional halohydrin, such as epichlorhydrin and alkali.

Epoxy resins of the type defined above having a molecular weight of from about 350 to 5000 are suitable for employment for impregnating inorganic fibers of sleeve 12 of the fuse tube of this invention. Preferred epoxy resins are those having a molecular weight of from about 350 to 3000. These epoxy resins are soluble in solvents such as ketones, esters, ethers, hydrocarbons and chlorinated hydrocarbons. Thus, an epoxy resin can be applied to inorganic fibers in the form of a solution of a suitable solvent. The amount of epoxy resin employed to impregnate the inorganic fibers may run about as high as about 60%, by weight, of the impregnated fibers, and preferably forms from about 32 to about 50%, by weight, of the impregnated fiber sleeve.

Curing or cross-linking agents, such as 4,4'-methylenedianiline, ethylenediamine, meta phenylenediamine, triethylenetriamine, diaminodiphenylsulfone, d i c y a n d i-amine, and acid anhydrides such as phthalic, dodecenyl, succinic, hexahydrophthalic and chlorendic anhydrides may be used to convert the epoxy resin into its infusible, insoluble state.

As stated above, the adhesive material by which sleeve 12 is bonded securely to tubular liner 11 comprises a thermosetting phenol aldehyde resin which may be converted by heat and also under pressure if desired into a form which is no longer fusible at high temperatures and which is no longer soluble in ordinary solvents, and a vinyl polymer selected from the group consisting of polyvinyl acetal, partially hydrolyzed polyvinyl acetate and copolymers of polyvinyl alcohol and polyvinyl acetate.

The thermosetting phenol aldehyde resins may be unsubstituted or substituted in the aryl group with alkyl and aryl groups. Typical of the alkyl substituted phenol aldehyde resins are cresol aldehyde resins and xylenol aldehyde resins; p-phenyl phenol aldehyde resins are typical of the aryl substituted phenol aldehyde resins. Various aldehydes, such as formaldehyde, acetaldehyde, benzaldehyde and furfural may be employed in the phenol aldehyde resin of the adhesive material of the fused tube of this invention. Also, various mixtures of the above-mentioned resins, as for example, a mixture of phenol formaldehyde and cresol formaldehyde resin may be employed. The preferred phenol aldehyde resin is a phenol formaldehyde resin.

Representative of the polyvinyl acetals, which may be employed in conjunction with phenol aldehyde resins to form the adhesive material of the refusible fuseholder of this invention are polyvinyl butyral, polyvinyl acetal and polyvinyl formal. Also, partially hydrolyzed polyvinyl acetate and copolymers of polyvinyl alcohol and polyvinyl acetate may be employed in conjunction with a hydroxybenzene aldehyde resin to form adhesive material 13. The preferred vinyl polymer is polyvinyl butyral. Such a polyvinyl butyral resin may be produced by the alcoholysis of polyvinyl acetate and the condensation of the resulting polyvinyl alcohol with butyraldehyde. The vinyl butyral resin so produced will comprise vinyl butyral groups, vinyl alcohol groups and vinyl acetate groups. The vinyl alcohol group may comprise from about 9 to about 19 percent of the resin, the vinyl acetate group from about .3 to about 2.5 percent, and the vinyl butyral group from about 78.5 to about 90.7 percent. A preferred vinyl butyral resin composition comprises about 80.7 percent of the vinyl butyral group, about 19 percent of the vinyl alcohol group, and about .3 percent of the vinyl acetate group. Vinyl butyral resins of the above composition are completely compatible and reactive with a thermosetting phenolformaldehyde resin. The specific gravity of the polyvinyl butyral resin may vary between about 1.07 and 1.20, and a vinyl butyral resin having the above preferred composition is about 1.12.

The adhesive materials employed in the fuse holders of this invention have the property of being converted by heat into an insoluble and infusible resinous material that has good electrical and physical properties. The cured adhesive is highly resistant to moisture. However, the resin constituents of the adhesive prior to being converted into an infusible, insoluble resinous mass, because of their hydrophylic properties, have an affinity for the cellulose fibers of the fiber tube. In addition, the adhesive material also has an excellent affinity for both the inorganic fibers and epoxy resin of the sleeve. Thus, there is provided an excellent bond between the fiber tube and sleeve.

The adhesive material may comprise generally from about 15 percent to about 50 percent, and preferably from about 20 to about 35 percent phenol aldehyde resin and from about 85 percent to about 50 percent, and preferably from about 80 to about 65 percent of a vinyl polymer of the type hereinbefore described.

The above-mentioned phenol aldehyde resin in the initial state of polymerization or condensation and vinyl polymer may be combined to form adhesive material 13 in the form of a solution of the resins. Both the phenol aldehyde resin and vinyl polymer are soluble in lower aliphatic ketones, such as acetone, and lower aliphatic alcohols, such as ethyl alcohol. Other solvents which form suitable solutions of the resins of which adhesive 13 is comprised may be used. Solutions which have a resin solids content generally between 5 and 25% and preferably between 12 to 15 percent resin may be employed. A preferred resin solution comprises 11.5 parts, by weight, of an alcohol solution containing 55 percent of a phenol formaldehyde resin and 26 parts, by weight, of the above-mentioned preferred vinyl butyral resin dissolved in a solvent composed of 90.5 parts of acetone and 201 parts of isopropyl alcohol.

The quantity of adhesive material which is employed to bond outer sleeve 12 to inner tubular liner 11 should be sufficient to substantially entirely coat the exterior circumferential surface of inner tubular liner 11. Excessive amounts of adhesive material should not be used, since the closer the outer sleeve engages the inner tube, the greater will be the resulting bond strength. After the adhesive material in the form of a solution has been applied to the outer surface of the inner tube 11, the inner tube is placed in an oven to volatilize the solvent and preferably promote some curing of the adhesive material. Oven temperatures for this purpose should not exceed about 275° F., and the duration of treatment at such elevated temperature will depend upon the type of solvent and curing properties of the resin and generally should not exceed about 30 minutes. Consideration in determining duration of treatment and temperature to effect volatilization of solvent and partial curing of the resins are well known to those skilled in the art.

In the final curing operation, the fuse tube comprising a liner of cellulose fibers and a sleeve preferably consisting of a glass cloth impregnated with an epoxy resin wound convolutely about the liner is heated, as for example in an oven, to an elevated temperature to cure the epoxy resin and adhesive material to bind the outer sleeve of epoxy resin impregnated inorganic fibers to the vulcanized fiber liner. By heating the fuse tube to a temperature from about 250° to about 300° F. for a period of from about 2 to about 4 hours, depending on temperature and wall thickness of the sleeve, curing the epoxy resin and the adhesive material may be accomplished. Epoxy resin and adhesive curing conditions are well known and will present no problem to one skilled in the art.

The unexpectedly high strength of the bond obtained between sleeve 12 and the inner tubular liner 11 by means of the adhesive material employed will be clearly evident from a consideration of the following examples of the formation of fuse tubes in accordance with this invention.

*Example I*

A fuse tube is made utilizing an inner vulcanized fiber tube of ½" I. D. x ¾" O. D. The exterior circumferential surface of this fiber tube is substantially free from irregularities as a result of rolling operations employed to reduce the outside diameter of the tube to the desired value. The exterior circumferential surface of the fiber tube is coated with an adhesive material comprising 10 parts, by weight, of a phenol formaldehyde varnish (phenol formaldehyde T-80 varnish) containing 55%, by weight, of thermosetting phenol formaldehyde resin and 45% of ethyl alcohol, and 10 parts, by weight, of a solution of a polyvinyl butyral resin (Bakelite XYHL Vinyl Butyral resin) consisting of 80.7%, by weight, of vinyl butyral, 19% vinyl alcohol resin and 0.3% vinyl acetate resin dissolved in 100 parts of a solvent comprising 40% acetone and 60% isopropyl alcohol. The vulcanized fiber tube coated with adhesive is placed in an oven at a temperature of about 235° F. for a period of about 20 minutes to remove the solvent and promote some curing of the adhesive material. A glass cloth impregnated with about 45%, by weight of impregnated cloth, of an epoxy resin, formed by reacting bis-phenol A with epichlorohydrin, is wound convolutely about the vulcanized fiber tube in a conventional tube rolling machine until the resulting sleeve has an outside diameter of about 1". 4,4'-methylenedianiline is employed as a curing or cross-linking agent to convert the epoxy resin into an infusible, insoluble state. After the rolling operation, the tube is passed through an oven having 3 heated zones, the temperature of the first zone being 250° F., that of the second being 275° F., and that of the third being 290° F. The tube remains for a period of one hour in each of the first two zones and for a period of about two hours in the third zone. The tube is removed from the oven, allowed to cool, ground to the desired size, and then cut into 1" lengths.

Several 1" lengths of the completed tube are subjected to a "push-out" test in which force is applied to the fiber tube in a longitudinal direction while resistance to this force is applied through the sleeve. The average force, expressed in pounds, necessary to push the fiber tube free of the epoxy resin impregnated glass cloth sleeve is measured and found to be 5,635 pounds for four samples.

A number of fuse tubes having dimensions similar to those of Example I are made in accordance with the procedure of that example. However, in one case the exterior circumferential surface of the vulcanized fiber tube is knurled with a die to form indentations therein prior to coating of the surface with adhesive material and forming the sleeve thereover. In another case, the rolled fiber tube is passed through a centerless grinder where the exterior circumferential surface of the tube is slightly ground with a relatively fine grinding wheel to provide the tube with more uniform dimensions prior to application of adhesive material, and in the third instance a rolled tube is subjected to a rough sanding operation in which a substantial portion of the tube surface is removed prior to application of adhesive material.

Fused tubes formed with inner tubular members of the several types are subjected to a "push-out" test. The average force for four specimens of a fuse tube with a tubular liner having a rolled surface is 5,635 pounds, and that for four specimens having a ground tubular liner is 5,788 pounds. On the other hand, two samples of a fuse tube, the liner of which has a knurled surface, need but an average force of 4,335 pounds to separate the sleeve from the tubular liner. Similarly, the fuse tube having a rough sanded surface need a force of but 4,990 pounds to separate the liner from the sleeve. These results indicate that the bond obtained between the vulcanized fiber inner tube and the outer sleeve is significantly greater for a vulcanized fiber tube having an outer circumferential surface of relatively low density fiber than for one of greater fiber density resulting from knurling and rough sanding operations.

The tubes formed according to the above examples are also subjected to a "tightness test," which comprises cutting each tube into semi-circular segments and operating the sleeve from the inner vulcanized fiber tube by means of a knife. Although this test depends on the human factor to determine the strength of the bond; however, any indication of tearing of the fiber or of the glass fabric is an indication of a good to excellent bond. On the other hand, poorly bonded materials separate at the adhesive without showing any evidence of torn surfaces. According to the tightness tests conducted, a vulcanized fiber tube whose exterior surface has merely undergone a rolling operation is extremely difficult to separate from the epoxy-resin impregnated glass sleeve and upon separation of the sleeve and liner, the fibers of the liner are badly torn over substantially the entire surface of the liner. The bond between the sleeve and inner tube may be considered to be excellent. A vulcanized fiber tube having a ground exterior circumferential surface is found to be somewhat less difficult to separate from the outer sleeve than the tube having a roller surface. Nevertheless, fibers of the fiber tube are found to adhere to the sleeve, and the bond is considered to be very good to excellent. Tightness tests conducted on the tubes having knurled and rough sanded surfaces indicate that the bonds obtained are not as adherent as the bond obtained with a rolled tube. The bond produced with a knurled surface is particularly poor.

Referring to the drawing, and more particularly to Fig. 1, shown therein is an electric arc interrupting device comprising a refusible fuseholder of this invention in combination with means adapted to fuse and form an arc on the occurrence of an overload in an electric circuit. In the figures, 11 represents an inner tubular liner of vulcanized fiber adapted to evolve electric arc extinguishing gases when subjected to an electric arc. Surrounding liner 11 is a sleeve 12 comprising a woven glass fabric wound convolutely about liner 11. The glass cloth is impregnated with an epoxy resin for bonding the convolutions of the cloth together. Sleeve 12 is firmly bonded to tubular liner 11 by a layer of adhesive material 13, of the type hereinbefore described. The fuseholder is provided with terminals 14 and 15 at its ends. This construction provides the well known form of plain expulsion type fuse device.

The terminals 14 and 15 are connected by a replaceable fuse link, illustrated generally at 16. The fuse link comprises an upper terminal 17, having a threaded shank 18 on which is threaded a removable buttonhead 19. It will be noted that the buttonhead 19 abuts the upper end of the terminal 14 and that it is secured thereto by a screw cap 20. Depending from the terminal 17 are strain and fusible elements or wires 21 and 22, respectively. At their lower ends, the strain and fusible wires 21 and 22 are fastened to a lower terminal 23 which is connected by means of a flexible conducting lead 24 to the lower fuse tube terminal 15. It is clamped thereto by a clamp 25 held in place by a screw 26.

It will be observed that the refusible fuseholder of Fig. 2 may be used out of doors where it is subjected to the direct action of the weather since sleeve 12 is extremely weather resistant. The liner 11 of the fuse tube, when subjected to the heat of the arc formed on fusing of the strain and fusible wires 21 and 22 between the terminals 17 and 23, evolves arc extinguishing gases which create an expulsive effect to drive the terminal 23 out of the lower end of the tube, thereby extending the arc and at the same time substituting in the arc space a relatively inert non-ionized medium which prevents the arc from restriking. Because of the strength imparted by the sleeve 12, rupture of liner 11 is effectively prevented.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

It is claimed:

1. A conduit adapted to contain a fuse in a current interrupting device comprising an inner tubular liner of vulcanized fiber, a sleeve for said liner comprising inorganic fibers impregnated and bonded together with an epoxy resin, and an adhesive material disposed between said liner and said sleeve by which said liner is bonded to said sleeve comprising a phenolaldehyde resin which upon heating is capable of being converted to the infusible, insoluble state, and a vinyl polymer selected from the group consisting of a polyvinyl acetal, a partially hydrolyzed polyvinyl acetate, and a copolymer of polyvinyl alcohol and polyvinyl acetate.

2. The conduit of claim 1 in which said adhesive material comprises from about 15% to about 50%, by weight of phenol aldehyde resin, and from about 85% to about 50% of vinyl polymer.

3. The conduit of claim 1 in which said phenol aldehyde resin comprises a phenol formaldehyde resin and said vinyl polymer comprises a vinyl butyral resin.

4. The conduit of claim 3 in which said adhesive material comprises from about 20% to about 35%, by weight, of phenol aldehyde resin, and from about 80% to about 65% of vinyl polymer.

5. The conduit of claim 1 in which said inorganic fibers comprise glass fibers.

6. A conduit adapted to contain a fuse in a current interrupting device comprising an inner tubular liner of vulcanized fiber, a sleeve for said liner comprising glass cloth wound convolutely about said liner, the convolutions of said cloth being impregnated with and bonded together by means of an epoxy resin, and adhesive material disposed between said liner and said sleeve by which said liner is bonded to said sleeve comprising a phenol aldehyde resin which upon heating is capable of being converted to the infusible, insoluble state, and a vinyl polymer selected from the group consisting of a polyvinyl acetal, a partially hydrolyzed, polyvinyl acetate, and a copolymer of polyvinyl alcohol and polyvinyl acetate.

7. The conduit of claim 6 in which said adhesive material comprises from about 15% to about 50%, by weight, of phenol aldehyde resin and from about 85% to about 50% of vinyl polymer.

8. The conduit of claim 6 in which said adhesive material comprises from about 20% to about 35%, by weight, of a phenol formaldehyde resin and from about 80% to about 65% of a polyvinyl butyral resin.

9. The conduit of claim 8 in which the fibers of said glass cloth are arranged primarily circumferentially and longitudinally of said tubular liner.

References Cited in the file of this patent

UNITED STATES PATENTS

| | | |
|---|---|---|
| 2,328,825 | McMahon | Sept. 7, 1943 |
| 2,430,053 | Hershberger | Nov. 4, 1947 |
| 2,487,223 | Cupery | Nov. 8, 1949 |
| 2,586,171 | McMahon | Feb. 19, 1952 |
| 2,626,223 | Sattler et al. | Jan. 20, 1953 |
| 2,727,961 | Smith | Dec. 20, 1955 |
| 2,795,523 | Cobb et al. | June 11, 1957 |